United States Patent
Pavlovic

(10) Patent No.: US 6,495,992 B1
(45) Date of Patent: *Dec. 17, 2002

(54) METHOD AND APPARATUS FOR CHARGING BATTERIES UTILIZING HETEROGENEOUS REACTION KINETICS

(75) Inventor: Vladimir S. Pavlovic, Mississauga (CA)

(73) Assignee: Norvik Traction Inc., Mississauga (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,010

(22) Filed: Apr. 2, 1997

Related U.S. Application Data

(63) Continuation-in-part of application No. 08/621,930, filed on Mar. 26, 1996.

(51) Int. Cl.$^7$ ............................................. H01M 10/46
(52) U.S. Cl. ...................................................... 320/161
(58) Field of Search ................................. 320/148, 162, 320/163, 161, 160, DIG. 12; 324/430

(56) References Cited

U.S. PATENT DOCUMENTS

| | | | |
|---|---|---|---|
| 3,517,293 A | 6/1970 | Burkett et al. | 320/14 |
| 3,559,025 A | 1/1971 | Burkett et al. | 320/14 |
| 3,597,673 A | 8/1971 | Burkett et al. | 320/5 |
| 3,609,503 A | 9/1971 | Burkett et al. | 320/5 |
| 3,614,582 A | 10/1971 | Burkett et al. | 320/5 |
| 3,614,583 A | 10/1971 | Burkett et al. | 320/5 |
| 3,614,584 A | 10/1971 | Burkett et al. | 320/35 |
| 4,396,880 A * | 8/1983 | Windebank | |
| 4,746,852 A | 5/1988 | Martin | 320/20 |
| 4,829,225 A | 5/1989 | Podrazhansky | 320/14 |
| 5,160,880 A * | 11/1992 | Palanisamy | |
| 5,179,335 A | 1/1993 | Nor | 320/21 |
| 5,202,617 A | 4/1993 | Nor | 320/2 |
| 5,204,611 A | 4/1993 | Nor et al. | 320/21 |
| 5,206,578 A | 4/1993 | Nor | 320/14 |
| 5,291,116 A * | 3/1994 | Feldstein | 320/119 |
| 5,304,914 A * | 4/1994 | Feldstein | 320/129 |
| 5,307,000 A * | 4/1994 | Podrazhansky et al. | 320/129 |
| 5,469,043 A * | 11/1995 | Cherng et al. | 320/161 |
| 5,489,836 A * | 2/1996 | Yuen | |
| 5,493,196 A * | 2/1996 | Feldstein | 320/118 |
| 5,523,667 A * | 6/1996 | Feldstein | 320/118 |
| 5,523,668 A * | 6/1996 | Feldstein | 320/118 |
| 5,550,453 A * | 8/1996 | Bohne et al. | |
| 5,583,413 A * | 12/1996 | Proctor et al. | |
| 5,589,757 A * | 12/1996 | Klang | |
| 5,656,920 A * | 8/1997 | Cherng et al. | |
| 5,680,031 A * | 10/1997 | Pavlovic et al. | 320/112 |
| 5,710,506 A * | 1/1998 | Broell et al. | 320/145 |
| 6,094,033 A * | 7/2000 | Ding et al. | 320/132 |

FOREIGN PATENT DOCUMENTS

| | | |
|---|---|---|
| EP | 0593196 A2 | 4/1994 |
| WO | WO 93/15543 | 8/1993 |
| WO | WO 93/15544 | 8/1993 |

* cited by examiner

*Primary Examiner*—Edward H. Tso
*Assistant Examiner*—Pia Tibbits

(57) ABSTRACT

A method and apparatus utilizing a new parameter for assessing battery charge acceptance for controlling the charging process of the battery. The charge acceptance parameter comprises a terminal voltage profile which is determined during a variation in a diagnostic current. The slope of the terminal voltage profile is used in the charging process to assess the charge acceptance ability of the battery and thereby control the charging current. For a first group of batteries including lead-acid and nickel-cadmium batteries, the terminal voltage profile is characterized by an increasing profile slope as the charge acceptance ability of the battery is reached. For a second group of batteries comprising nickel-metal hydride batteries, the terminal voltage profile is characterized by a profile slope which approaches zero as the charge acceptance ability of the battery is reached.

22 Claims, 9 Drawing Sheets

SYSTEM ARCHITECTURE

METHOD AND APPARATUS FOR CHARGING BATTERIES UTILIZING HETEROGENEOUS REACTION KINETICS

This application is a continuation-in-part of U.S. patent application Ser. No. 08/621,930 filed Mar. 26, 1996, and assigned to a common owner.

FIELD OF THE INVENTION

The present invention relates to battery charging, and more particularly to a method and apparatus for charging a battery utilizing heterogeneous reaction kinetics.

BACKGROUND OF THE INVENTION

Batteries are devices that convert chemical energy contained in active materials directly into electrical energy by means of an oxidation-reduction electrochemical reaction involving the transfer of electrons from one material to another. Batteries are characterized as primary batteries and secondary batteries. Both types of batteries are widely used. Secondary batteries are particularly popular because they can be recharged, i.e. the state of the battery is restored.

Rechargeable or secondary batteries are recharged using chargers which fall into two broad classes: simple chargers, and closed-loop or feedback chargers. Simple chargers deliver a low level charge current to the battery over a timed interval. The current level is chosen to prevent damage to the battery due to overcharging. Feedback chargers, on the other hand, monitor the state of the battery in order to control the magnitude of the charge current during the charge cycle. The charge cycle is composed of a high current phase and a regulation phase. During the high current phase, the feedback charger applies a high charge current to the battery in order to rapidly charge the battery. The feedback charger continues to monitor the state of the battery and reduces the charging current as the charge state of the battery is restored.

The capacity and cycle life expectations of batteries depend on many different factors. Charge parameters are particularly important and strongly influence the charge capacity of the battery.

In U.S. Pat. No. 5,179,335 assigned to the common owner of the subject invention, a method and apparatus for controlling the charging process through the resistance free voltage was disclosed. The resistance free voltage represents the charge acceptance voltage of the battery. The charge acceptance voltage is calculated during a diagnostic current interruption as disclosed in U.S. Pat. No. 5,179,335 or calculated from the terminal voltage determined from the charging current and the internal charge resistance when the charging current is varied as taught in pending U.S. patent application Ser. No. 08/621,930 also assigned to the common owner of the subject invention. As further disclosed in U.S. patent application Ser. No. 08/621,930, the calculated charge acceptance voltage is compared with a temperature compensated reference voltage and the charging current is adjusted so that the measured or calculated charge acceptance voltage does not exceed the set reference voltage which has been temperature compensated.

Although the process has been successfully used for many years and is superb compared to other charging methods, there are some disadvantages. The present invention addresses these disadvantages by providing a novel method and apparatus for charging batteries.

BRIEF SUMMARY OF THE INVENTION

It has been found that the resistance free or charge acceptance voltage cannot be used as the only criterion for representing the charge acceptance ability of a battery, i.e. the capability of a battery to take a maximum charging current without damage. Even for the same type of battery and battery chemistry, the charge acceptance voltage is influenced by many factors such as the internal temperature, battery age and previous charging cycles. The internal temperature parameters, plate and electrolyte, are particularly important and influence the resistance free or charge acceptance voltage readings. It will be appreciated that any attempts to compensate the charge acceptance voltage are limited by the difficulty in measuring the actual internal temperature of the battery. In practical systems only the external battery temperature is available for measurement. Moreover, in a fast charge system, a high charging rate (current) can cause a significant temperature gradient within the battery, thereby magnifying the effect of temperature on the charge acceptance voltage and the control of the charging process.

In another aspect, the present invention provides a method and apparatus which utilizes a new parameter or indicator for assessing battery charge acceptance for controlling the charging process. The method and apparatus advantageously overcomes the problems associated with the dependence of charge acceptance voltage on temperature.

According to one aspect of the present invention, the battery charge acceptance ability is determined from a terminal voltage profile taken during a variation in a diagnostic current. The variation period is preferably in the range of 4 to 1800 ms in duration. A larger variation period may be used, but will tend to slow down the charging process.

According to the invention, the terminal voltage profile will have distinctive characteristics and two terminal voltage profiles are provided on the basis of the battery chemistry.

The first group of batteries having a characteristic terminal voltage profile comprise lead-acid, nickel-cadmium, etc . . . batteries. The terminal voltage profile is characterized by an increasing profile slope during the current variation. It is believed that the profile slope is due to the increasing mass transport resistance. According to this aspect of the invention, at the beginning of the charging process, i.e. when the battery is discharged and the actual charging rate is below the battery charge acceptance, the voltage profile is almost flat during the current variation. As the battery charges, the slope of the voltage profile increases until the charge acceptance ability of the battery is reached. Once the charge acceptance ability of the battery is reached, the charging current is reduced in order to match the diminished charge acceptance ability of the battery.

The second group of batteries having a characteristic terminal voltage profile comprises nickel-metal hydride batteries. The terminal voltage profile for the second group exhibits the greatest slope at the beginning of the charging process, i.e. when the battery is fully discharged. As the battery charges, the slope of the voltage profile decreases, and approaches zero when the charging rate has reached the charge acceptance ability of the battery. The mechanism of the voltage profile for these batteries may be explained by the hydrogen absorbing alloy becoming saturated as the battery is charged resulting in hydrogen transport rate decrease.

According to another aspect of the present invention, the slope of the terminal voltage profile is used in the charging process to assess the charge acceptance ability of the battery and thereby control the charging current. In one embodiment, the slope of the voltage profile is used to control the reference voltage setpoint ($SV_{ref}$) so that an optimum value is obtained for the particular battery pack being charged, thereby providing a charge acceptance value based on the actual battery pack. The voltage profile is determined during a current variation interval. An advantage of utilizing the voltage profile slope according to the present invention is the elimination of the need to compensate the reference setpoint voltage for the effects of temperature.

In another embodiment, the voltage profile is determined during the charging current ramp-up phase at the beginning of the charging cycle. Once the maximum charging current is reached, the voltage profile is updated periodically or after certain percentages of the terminal voltage rises are achieved to assess the charge acceptance ability of the battery. Once the charge acceptance ability is reached, the charging current is decreased in discrete steps so that the charging current does not exceed the diminishing charge acceptance ability for the battery. The step change in the charging current advantageously provides a means for determining the voltage profile and thereby the battery charge acceptance ability without further current interruptions.

In a first aspect, the present invention provides an apparatus for charging a rechargeable battery, said apparatus comprising generator means for generating a charging current having a variable level, and during a first charging period said current having a level to rapidly charge the battery at a rate in amperes greater than the capacity in ampere-hours of the battery; controller means for controlling said generator means, said controller means including (a) means for varying said charging current for a predetermined variation interval; (b) means for generating a terminal voltage profile for the battery in said variation interval; (c) means for determining a charge acceptance ability for the battery from said terminal voltage profile; and (d) means for controlling the level of said charging current in response to said charge acceptance ability.

In a second aspect, the present invention provides a method for charging a rechargeable battery comprising the steps of: (a) generating a charging current having a variable level; (b) maintaining said charging current during a first charging period at a level to rapidly charge the battery at a rate in amperes greater than the capacity in ampere-hours of the battery; (c) changing the level of said charging current for a predetermined interval; (d) generating a terminal voltage profile for the battery in said predetermined interval; (e) determining a charge acceptance ability for the battery from said terminal voltage profile; and (f) controlling the level of said charging current in response to said charge acceptance ability.

In another aspect, the present invention provides a method for determining charge acceptance ability for a battery during the charging cycle when a charging current is applied to a rechargeable battery, said method comprising the steps of: (a) ramping the charging current up to predetermined level; (b) obtaining a first slope reading by measuring the rate of change of the terminal voltage of the battery during said current ramping stage; and (c) determining the charge acceptance ability for the battery from said first slope reading.

BRIEF DESCRIPTION OF THE DRAWINGS

Reference will now be made to the accompanying drawings which show by way of example preferred embodiments of the present invention and in which.

DETAILED DESCRIPTION OF THE PREFERRED EMBODIMENTS

The charging method according to the present invention is a closed-loop fast charge method comprising a high current phase and a regulation phase. During the high current phase, the charging process applies a high charging current to the battery in order to rapidly charge the battery. During the regulation phase, the charging process reduces the charging current and regulates the charging current to complete the charging cycle for the battery. As will now be described, the present invention provides a charging method which optimizes the charging cycle to produce a fast charge without damaging the battery.

Figure 11:
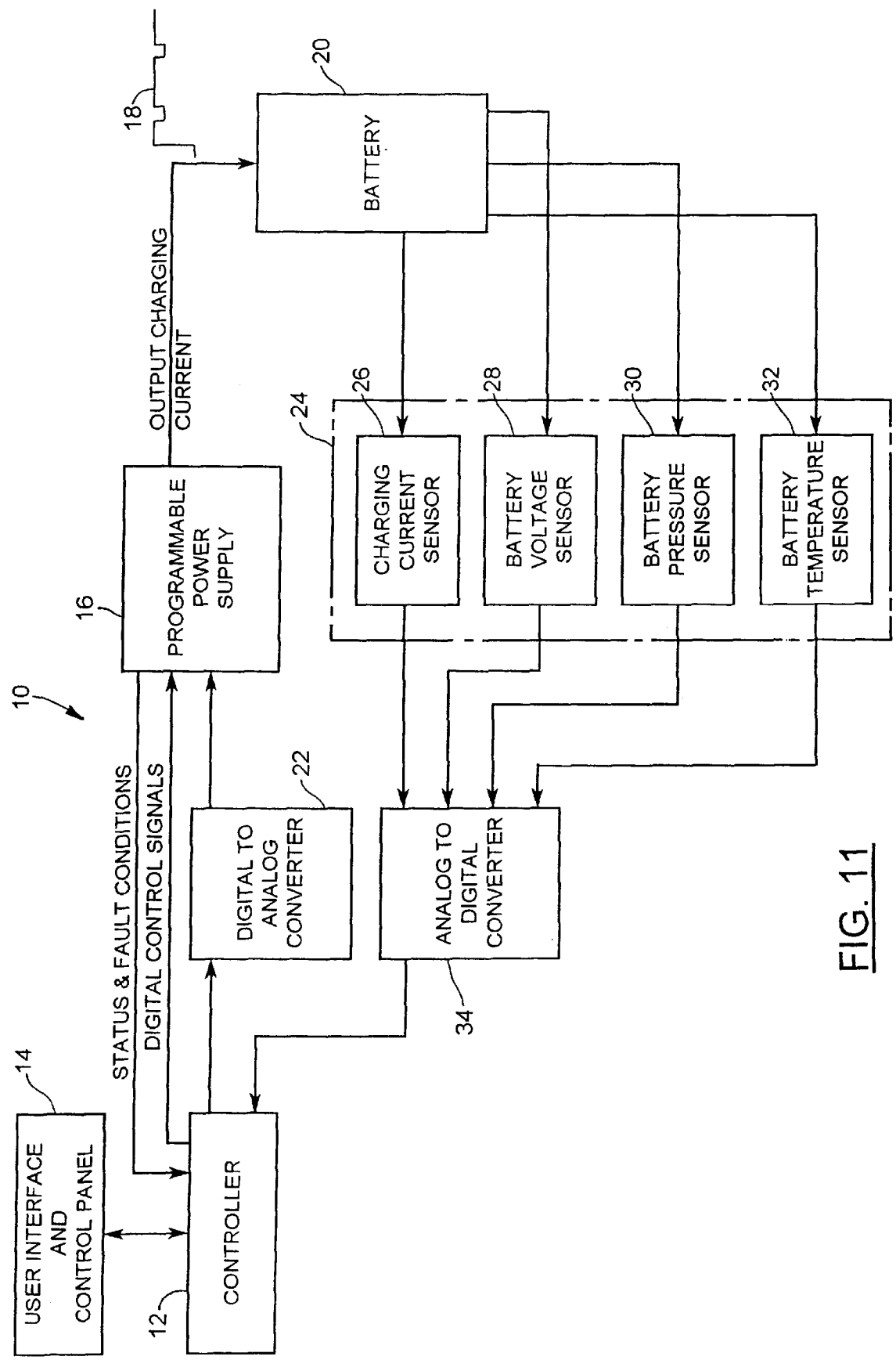
FIG. 11 is a block diagram of a battery charger suitable for the charging process according to the present invention.

Reference is first made to FIG. 11 which shows in block diagram a battery charger 10 for performing the charging method according to the present invention. The battery charger 10 comprises a controller 12, a user control interface and display panel 14, and a programmable power supply 16.

The programmable power supply 16 generates a charging current I indicated by reference 18 for charging a battery 20 which is coupled to the charger 10. The controller 12 is coupled to an analog input on the programmable power supply 16 through a digital-to-analog (D/A) converter 22. The D/A converter 22 provides an analog control signal output to the power supply representing the relative level of the charging current I to be applied to the battery 20. The analog input accepts a control voltage signal from the D/A converter 22 in the range 0 to 10VDC. The control voltage signal represents a range of 0% to 100% of the full scale output current capacity of the programmable power supply 16.

The programmable supply 16 also includes a buffered digital input/output (I/O) interface coupled to respective output and input ports on the controller 12. The programmable power supply 16 receives digital control signals issued by the controller 12 for setting the charging current I ON/OFF and for clearing a FAULT condition. Preferably, the power supply 16 accepts a digital input signal from the controller 12 which causes the instantaneous shut-down to 0% output charging current I. The programmable power supply 16 also outputs digital signals to the controller 12 to indicate status and fault conditions, for example, over-temperature, DC bus voltage too high, and DC bus voltage too low. One skilled in the art will be familiar with the implementation of the programmable power supply 16.

The controller 12 comprises a microprocessor, or processor board, which has been suitably programmed to execute a charging program and control method according to the present invention. The charging process is configured by parameters which are entered through the user interface and display panel 14. The user interface and display panel 14 preferably comprise a display and a keyboard, or keypad, for entering the charge parameters for a battery type. The user interface 14 may also include an input device for reading a battery parameter identifier which is associated with certain known types of batteries.

The controller 12 uses the display panel 14 to display battery charge status, charging system status indicators, fault conditions and diagnostic information. The display panel 14 also includes input keys to start/stop the battery charging process, and display prompts/messages for prompting the user to connect the battery 20 to the charger 1 and enter the charge parameters.

As described above, the charger 10 operates as a closed-loop or feedback charging system. The charger 10 as shown in FIG. 11 includes a sensor module 24 for monitoring various parameters of the battery 20. The sensors include a charging current sensor 26, a battery voltage sensor 28, a battery pressure sensor 30, and a battery temperature sensor 32. In the context of the present invention, the battery temperature sensor 32 provides a primarily diagnostic function as the reference voltage setpoint ($SV_{ref}$) is determined from the slope of the voltage profile and therefore temperature values for compensating the set-point reference $SV_{ref}$ are not necessary and the temperature sensor 32 merely provides a diagnostic input to the controller 12. The sensors 26, 28, 30, 32 comprise analog process measurement circuits and are coupled to respective input ports in the controller 12 through an analog-to-digital (A/D) converter 34.

The charging current sensor 26 monitors the charging current I and is implemented using a current transducer, such as the LEM Module LT 500 available from LEM S.A. of Switzerland, connected to a load resistor and an analog amplifier (not shown) for conditioning the signal. The implementation of such analog circuitry will be familiar to one skilled in the art.

The battery voltage sensor 28 monitors the output voltage of the battery 20 and preferably comprises a scalable signal conditioning amplifier (not shown) having galvanic isolation, for example, provided by an opto-coupler (not shown).

The battery pressure sensor 30 monitors the internal pressure of the battery 20 and is implemented using a suitable pressure transducer such as the PX302 model available from Omega Engineering Inc.

The battery temperature sensor 32 monitors the internal temperature of the battery 20 and is implemented using a solid state thermal sensor which is placed in contact with the exterior wall of the battery 20. A suitable temperature sensor is the LM335A solid state device available from National Semiconductor of Santa Clara, Calif. The temperature sensor 32 may include an analog conditioning amplifier (not shown) to condition the output signal from the temperature sensor 32. The output signals from the sensors 26–32 are fed into the A/D converter 34 and digitized for input by the controller 12. Preferably, the A/D converter 34 comprises a high speed 12-bit converter.

The digitized signals read by the controller 12 from the A/D converter 34 are utilized by the battery charging program and method in conjunction with battery and charge parameters inputted by the user. In response to the inputs, the process control program for the battery charger 10 calculates and updates the control commands for the programmable power supply 16. The process control program also continues to monitor the status and operation of the programmable power supply 16. If any faults are detected, the battery charging program terminates the charging cycle, i.e. turns off the power supply 16 and indicates the abort or fault status on the user display panel 14. The processing steps embodied in the battery charging program and method are described in detail below with reference to FIGS. 1 to 10.

The maximum rate at which a battery can accept current at any given moment without being overcharged is termed the charge acceptance ability. The charge acceptance ability or CAA is a function of the state of charge, temperature, age of battery and previous charging history. It is a feature of the present invention that the charging current I applied to the battery is controlled on the basis of the charge acceptance ability of the battery. The charge acceptance ability, in turn, is determined from the slope of the terminal voltage profile. According to this aspect of the invention, it has been found that the terminal voltage profile calculated for a battery during a charging cycle will exhibit certain characteristics and these characteristics are used to determine the charge acceptance ability, i.e. the ability of the battery to take the charging current, over the charging cycle.

Figure 1:
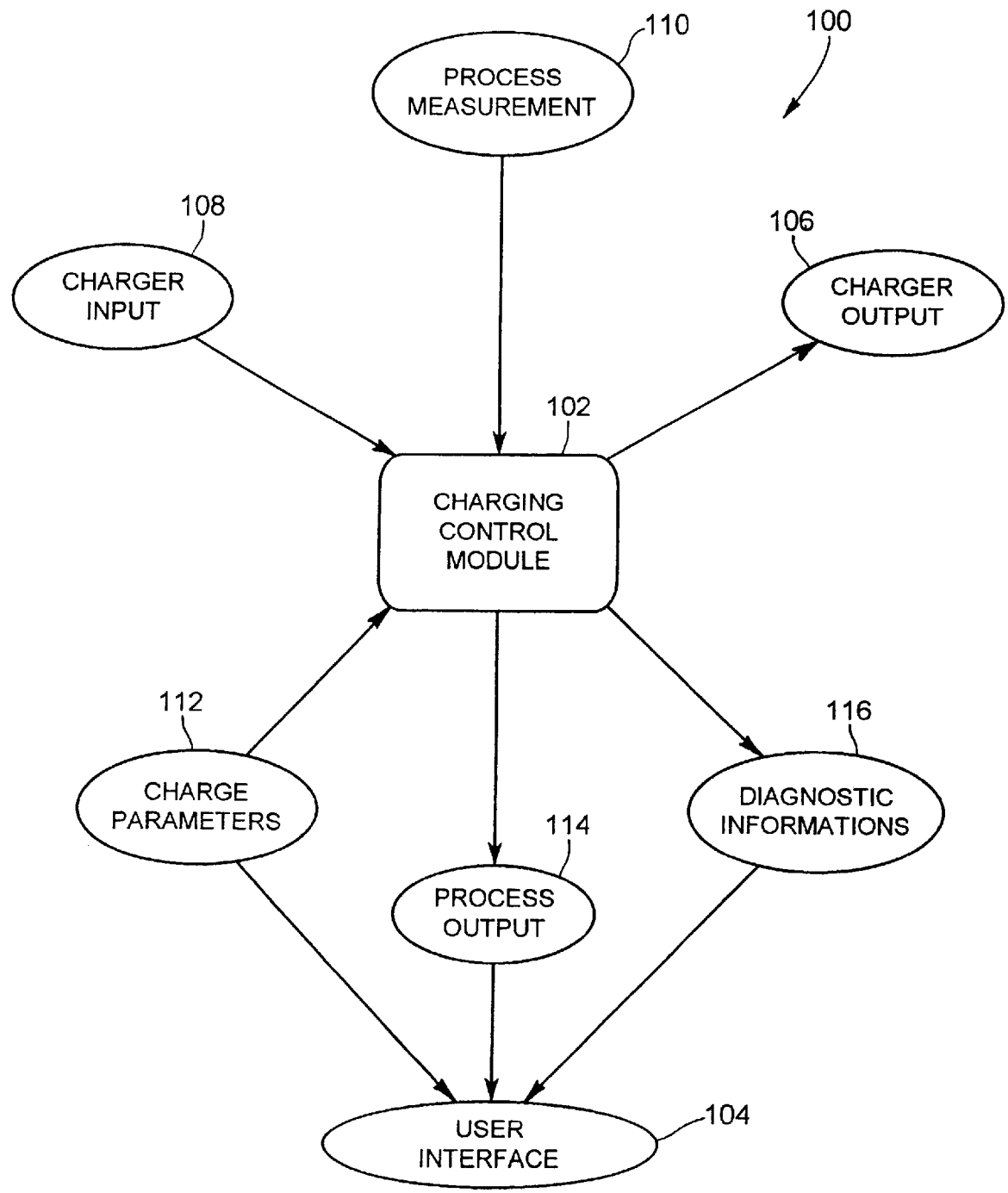
FIG. 1 shows in block diagram form a method for regulating a charging current according the present invention.

Reference is first made to FIG. 1 which shows in block diagram form the organization of a battery charging program 100 according to the present invention. The battery charging program 100 comprises a charging control module 102, a user interface module 104, a charger output module 106, a charger input module 108, and a process measurement module 110.

The charging control module 102 comprises the method steps for controlling the charging of the battery according to the present invention. The charging control module 102 is described in more detail below with reference to FIGS. 2 to 10.

The user interface module 104 comprises the functions which control the operation of the user control and display panel 14 (FIG. 11). The user interface module 104 processes inputs entered by the user into charge control parameters 112 which are used by the charge control module 102 as described in more detail below. The user interface module 104 also displays data from the charging control module 102 on the charging process as process outputs 114 and as diagnostic information 116 on the display panel 14.

The charger output module 106 controls the operation of the programmable power supply 16 in response to control commands issued by the charging control module 102. The charger output module 106 provides the digital control signals to the D/A converter 22 in order to generate the control voltage signal for the programmable power supply 16. The charger output module 106 also generates the digital output signals, e.g. charge current ON/OFF and FAULT reset, to control the programmable power supply 16.

The charger input module 108 receives the status and fault condition signals issued by the programmable power supply 16. The status and fault condition signals are received on the input port of the controller 12 and transmitted to the charging control module 102 for processing. For example, in response to a high pressure condition, the charging control module 102 aborts charging the battery 20, the power supply 16 is shut down through the charger output module 106, and an "abort message" is displayed on the display panel 14 by the user interface module 104.

The process measurement module 110 oversees the input of signals from the charging current, battery voltage, battery pressure, and battery temperature sensors 26, 28, 30, 32 (FIG. 11). The analog inputs from the sensors are then digitized by the A/D converter 34. The digitized information obtained from the sensors is then stored in memory for use by the charging control module 102 as will be described in more detail below.

Figure 2:
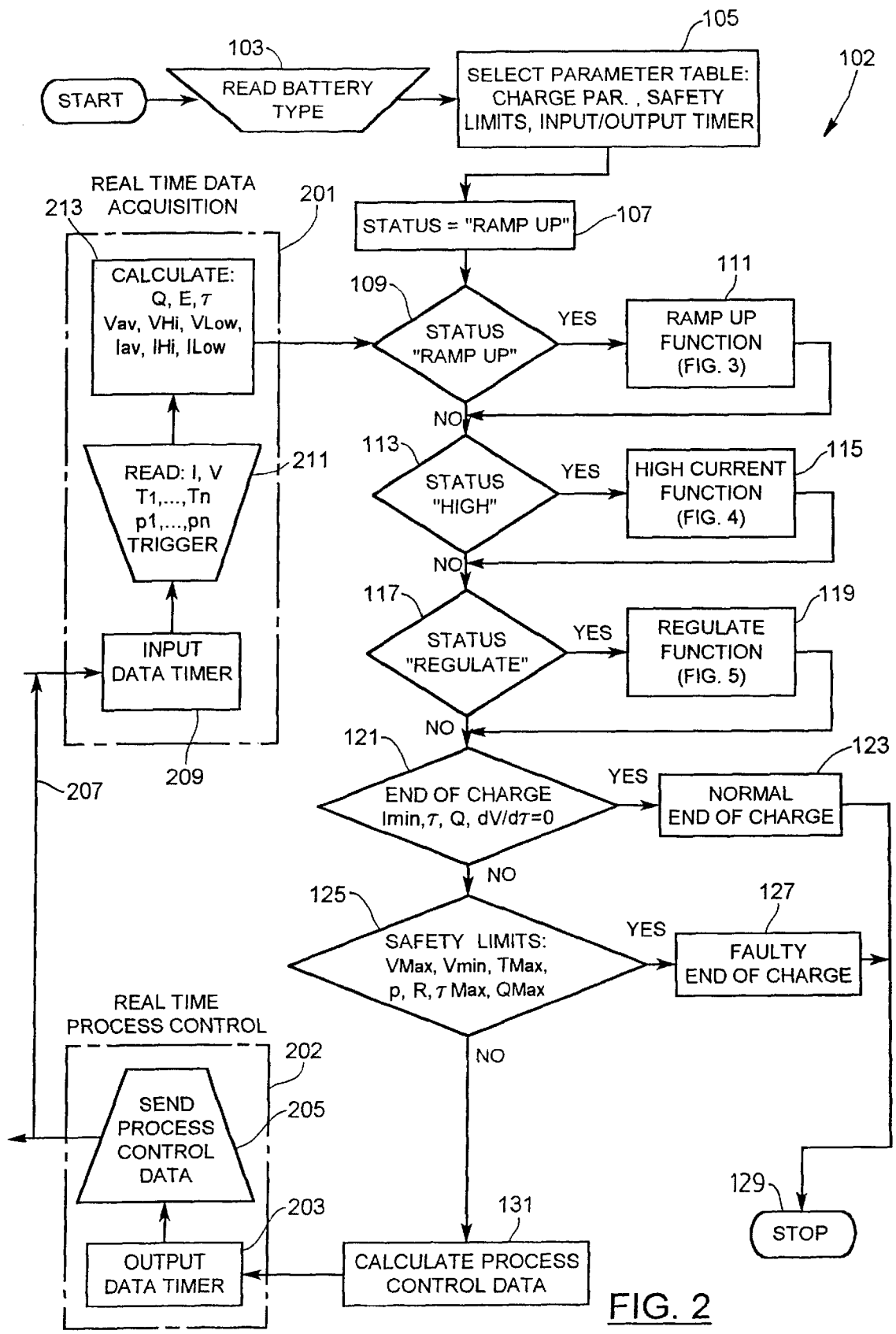
FIG. 2 is a flow chart for a charging method according to the present invention.

Reference is next made to FIG. 2, which shows the operation of the battery charger 10 and the charging control module 102 according to the present invention.

At the start, the charging control 102 reads the battery type identifier in step 103 if the charger 10 includes an input device for reading the battery identifier. If the charger 10 does not include a reader for the battery type, then the user is prompted to input the battery type using the interface 14. The battery type information, i.e. chemistry, is needed to determine the terminal voltage profile. The battery type is also used to select an appropriate Parameter table in step 105.

Figure 8:
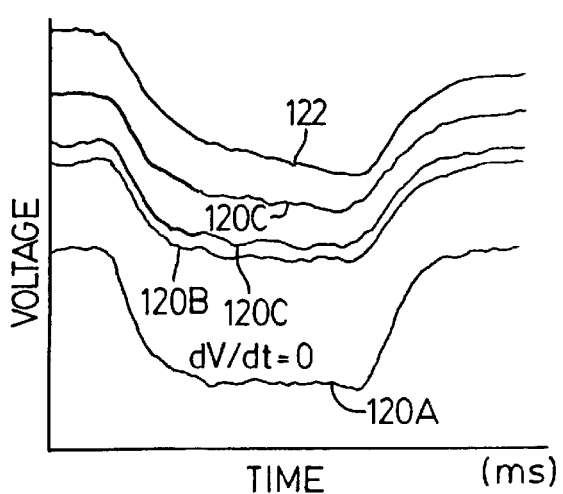
FIG. 8 is a graph showing voltage profiles characteristic of a first class of batteries.

The terminal voltage profile and the Parameter table are dependent on the type of battery. According to this aspect of the invention, batteries are categorized, in Group I or Group II. Group I batteries comprise the most common battery types and include lead-acid and nickel-cadmium batteries. Group II batteries have a terminal voltage profile with a slope dV/dt as shown in FIG. 8. The terminal voltage profile is defined as the voltage of the battery when the charging current I is interrupted or varied as will be described below. At the beginning of the charging process for Group I battery (i.e. the battery is discharged and the actual charging rate is below the battery charge acceptance ability) the slope dV/dt for the terminal voltage profile is almost flat as shown by curve 120a. As the battery is charged, the slope dV/dt of the terminal voltage profile increases as shown by curves 120b, 120c, 120d. When the battery becomes fully charged, the slope dV/dt of the terminal voltage profile reaches its maximum value as shown by curve 122. The maximum slope dV/d t of the terminal voltage profile, i.e. curve 122 in FIG. 8, means that charge acceptance ability CAA of the battery has been reached and the charging current I must be reduced in order to avoid overheating and damaging the battery.

Group II batteries comprise nickel-metal hydride batteries. Group II batteries have a terminal voltage profile with a slope dV/dt as shown by the curves in FIG. 9. When the battery is fully discharged, the slope dV/dt of the terminal voltage profile (i.e. taken during the current variation interval) will exhibit a maximum slope dV/dt as denoted by curve 124a in FIG. 9. As the battery is charged, the slope dV/dt of the terminal voltage profile (e.g. taken during successive current variation intervals) decreases as shown by curves 124b, 124c and 124d in FIG. 9. When the battery is charged, i.e. the charging rate reaches the charge acceptance ability, the slope dV/dt of the terminal voltage profile approaches zero as shown by curve 126 in FIG. 9.

The Parameter table read in step 105 is dependent on the particular type of battery, e.g. nickel-cadmium or lead-acid (Group I) or nickel-metal hydride (Group II). The table preferably includes charge parameters, safety limits, and a sampling rate or resolution for the input/output timers described in more detail below. Preferably, the parameters for various types of batteries contemplated for the charger 10 are stored in non-volatile memory, which is accessible by the controller 12.

As shown in FIG. 2, there are two modules 201, 202 which handle the data acquisition and control command transfer, respectively, with the charger 10. The data acquisition module 201 oversees the input of data from the sensors 26 to 32 (FIG. 11). The real time process module 202 outputs the digital control signals and the current control signal (via the D/A converter 22) to the programmable power supply 16.

In step 203 of the real time process control module 202, a time-base for outputting the output control commands is generated. Next at step 205, the output control commands are sent to the appropriate hardware drivers. As shown, there is also a loop-back path 207 between the real time process control module 202 and the real time data acquisition module 201. The loop-back 207 provides a "trigger" for the real time data acquisition module 201 as described below.

Referring to FIG. 2, in step 209 the data acquisition module 201 generates a time-base for inputting, i.e. sampling, data. The sampling rate depends on the particular hardware being utilized and the desired resolution for the process control as will be appreciated by those skilled in the art. For example, sampling once every 60 microseconds is suitable for the charger. In step 211, the data acquisition module 201 collects (at the sampling rate) current readings $I_1, \ldots I_n$ from the charging current sensor 26 (FIG. 11), voltage readings $V_1, \ldots V_n$ from the battery voltage sensor 28, pressure readings $P_1, \ldots P_n$ from the battery pressure sensor 30, and temperature readings $T_1, \ldots T_n$ from the battery temperature sensor 32.

In step 213, values for average voltage $V_{av}$, average charging current $I_{av}$, Coulombic charge Q, charge energy E, and elapsed charging time are calculated from the input data. The average current $I_{av}$ and average voltage $V_{av}$ values are calculated over a selected period. For example, one second. The Coulombic charge Q is calculated by integrating the values for the charging current $I_1, \ldots$ and the charge energy E is calculated from the average current $I_{av}$ and the average voltage $V_{av}$.

In step 211, data corresponding to the high value for the charging current $I_{Hi}$, the low value for the charging current $I_{Low}$, the high value for the voltage $V_{Hi}$, the low value for the voltage $V_{Low}$, are also read in conjunction with the trigger provided on the loop-back path 207 from the real time process control module 202. The trigger for the high charging current $I_{Hi}$ comprises the output command to the programmable power supply 16 to raise the charging current I to the high value. Similarly, the trigger for the low charging current $I_{Low}$ comprises the output command to the power supply 16 to lower the charging current I to the low value. The values for the high voltage $V_{Hi}$ and the low voltage $V_{Low}$ are read in a similar manner. The data generated by the data acquisition module 201 is stored in memory for further processing.

Referring to FIG. 2, at the beginning of a charging cycle, status is set to "RAMP UP" in block 107. The Ramp Up status means that the charging current I is ramped-up or increased to a HIGH current level. Then during the HIGH current phase of the charging cycle, the charging current I is maintained at a HIGH value until the charge acceptance ability of the battery is reached, at which time the charging current is regulated to complete or finish the charging of the battery.

In step 109, the "RAMP UP" status is checked. If the charger 1 is in RAMP UP mode, then a Ramp Up procedure 300 is called in step 111. The function of the Ramp Up procedure 300 is to increase or ramp the charging current I to the maximum value $I_{MAX}$ allowed for the particular battery being charged. The maximum current $I_{MAX}$ is conveniently stored in the Parameter table. The Ramp Up procedure 300 is shown in more detail in FIG. 3.

Figure 3:
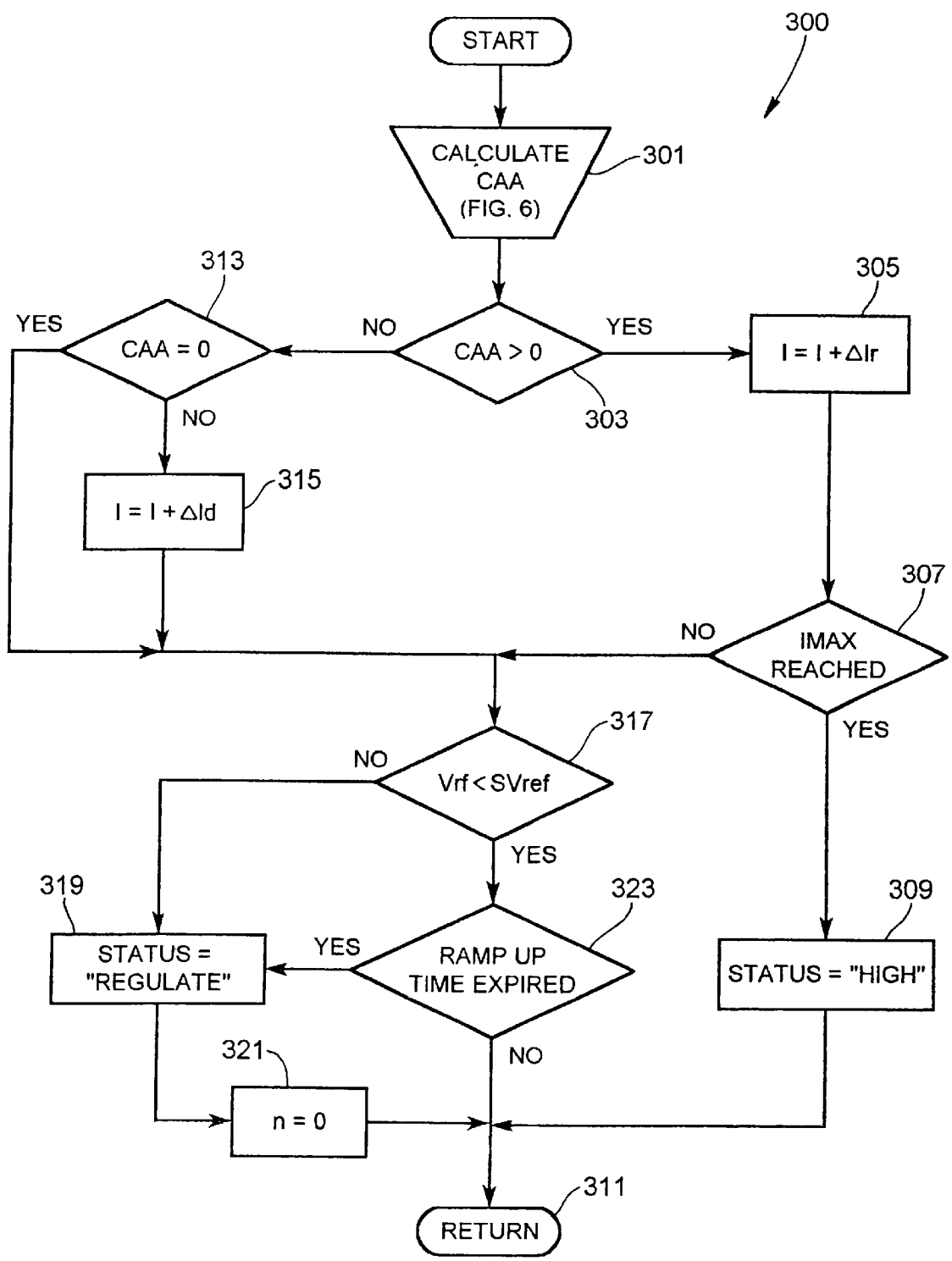
FIG. 3 is a flow chart of a ramp-up function for the charging method of FIG. 2.
Figure 9:
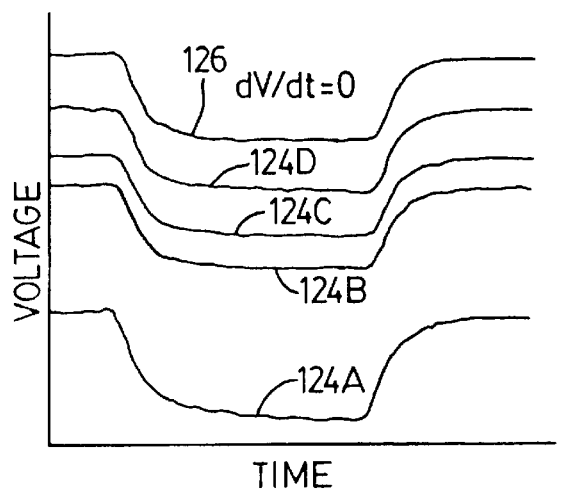
FIG. 9 is a graph showing voltage profiles characteristic of a second class of batteries.

Referring to FIG. 3, the first operation performed by the Ramp-Up procedure 300 is to calculate the charge acceptance ability CAA of the battery being charged. In step 301, a charge acceptance ability procedure 400 is called, and the charge acceptance ability procedure 400 is shown in more detail in FIG. 6. The function of the charge acceptance procedure 400 is to determine whether the charge acceptance ability of the battery has been reached. If the charge acceptance ability of the battery has not been reached, then the charging current I can be increased to continue the fast charging of the battery. According to this aspect of the invention, the charge acceptance ability CAA is determined from the slope dV/dt of the terminal voltage profile (FIGS. 8 and 9).

Figure 6:
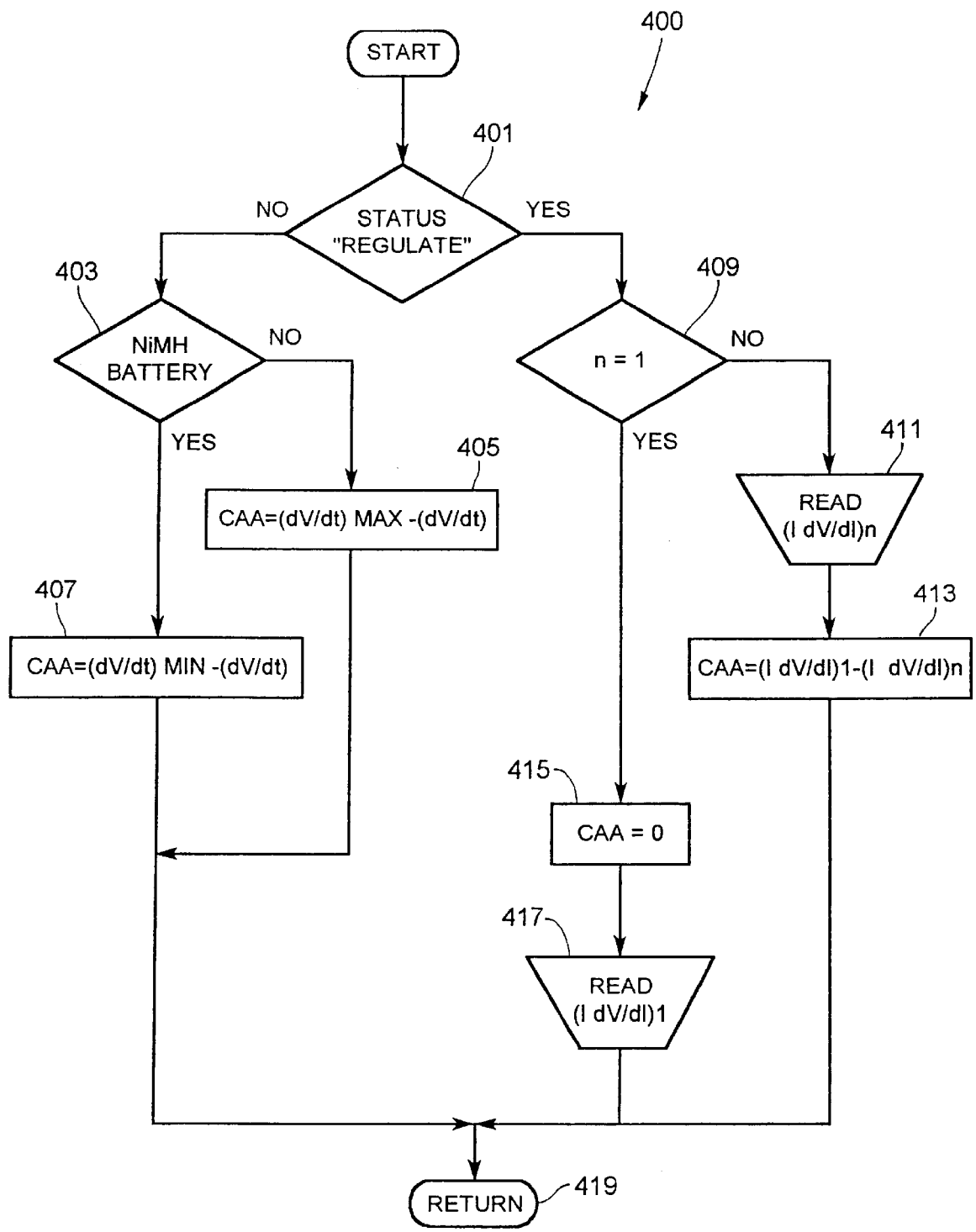
FIG. 6 is a flow chart of the method steps for determining charge acceptance ability according to the present invention.

As shown in FIG. 6, the charge acceptance ability procedure 400 first checks the mode of operation in step 401, and more specifically, if the mode is REGULATE. If the mode of operation is not REGULATE, then the charger 10 is in HIGH CURRENT or RAMP UP mode and the battery type is next checked in step 403. As described above, the charging method according to the present invention distinguishes between Group I and Group II batteries and uses the slope dV/dt of the terminal voltage profile to ascertain the charge acceptance ability CAA of the battery. If the battery is a nickel-metal hydride (NiMH) battery in Group II, then the slope dV/dt for the terminal voltage profile approaches zero (FIG. 9) when the charge acceptance ability is reached, i.e. the battery is charged. Conversely, for Group I batteries the slope dV/dt of the terminal voltage profile reaches a maximum (FIG. 8) when the charge acceptance ability is reached. For a Group I battery, the charge acceptance ability CAA is calculated in step 405 by taking the difference between the maximum value for the slope $dV/dt_{MAX}$ and the present slope dV/dt for the terminal voltage profile. The maximum value for the slope $dV/dt_{MAX}$ is conveniently stored in the Parameter table. As the battery is charged, the difference between the maximum slope $dV/dt_{MAX}$ and the actual slope dV/dt will become smaller, and the charge acceptance ability is reached when CAA=0 in step 405.

Figure 7:
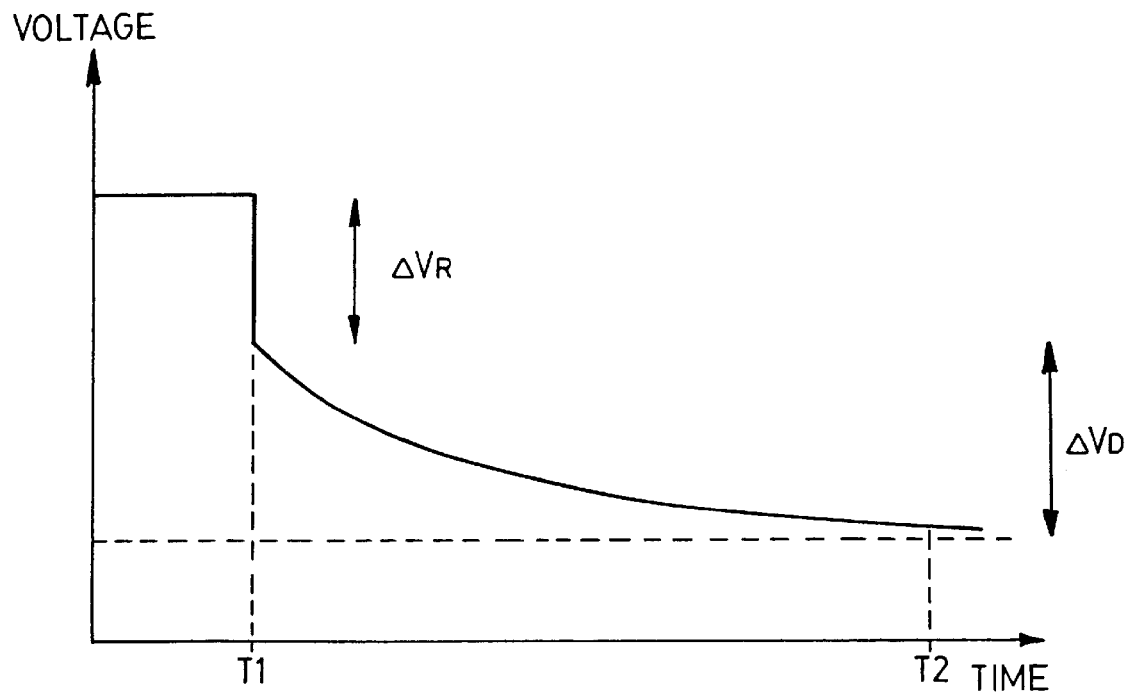
FIG. 7 is a graph showing the relationship between the Ohmic resistance voltage drop and the voltage drop resulting from ion migration through the electrolyte concentration boundary layer.

The terminal voltage profile is measured during a variation interval in the charging current or calculated from the terminal voltage by means of charging current I and battery internal resistance when the current is not interrupted. As shown in FIG. 7, when the charging current I is interrupted or varied, there is a drop in the terminal voltage (represented by the curve in FIG. 7) comprising two components or phases: voltage $V_R$ and voltage $V_D$. The voltage $V_R$ is a voltage transpose and occurs almost simultaneously after the charging current I is varied, indicated at time $T_1$ in FIG. 7. The voltage transpose $\Delta V_R$ is caused almost entirely by Ohmic losses inside the battery (e.g. Ohmic losses in the posts, plates, intercell wiring and the like). The second component comprises a voltage charge $\Delta V_D$ in the terminal voltage. The voltage charge $\Delta V_D$ has a slope dV/dt and according to this aspect of the invention the slope dV/dt of the terminal voltage profile is utilized to determine the charge acceptance ability of the battery.

Referring back to FIG. 6, for a Group II battery, i.e. nickel-metal hydride, the charge acceptance ability CAA is calculated in step 407. According to this aspect of the invention, the slope dV/dt of the terminal voltage profile approaches a minimum when the battery is charged. In step 407, the charge acceptance ability CAA is calculated as the difference between the minimum slope $dV/dt_{MIN}$ and the current slope dV/dt of the terminal voltage profile. For a NiMH battery, the difference between the minimum slope $dV/dt_{MIN}$ and the slope dV/dt will approach zero.

Figure 10:
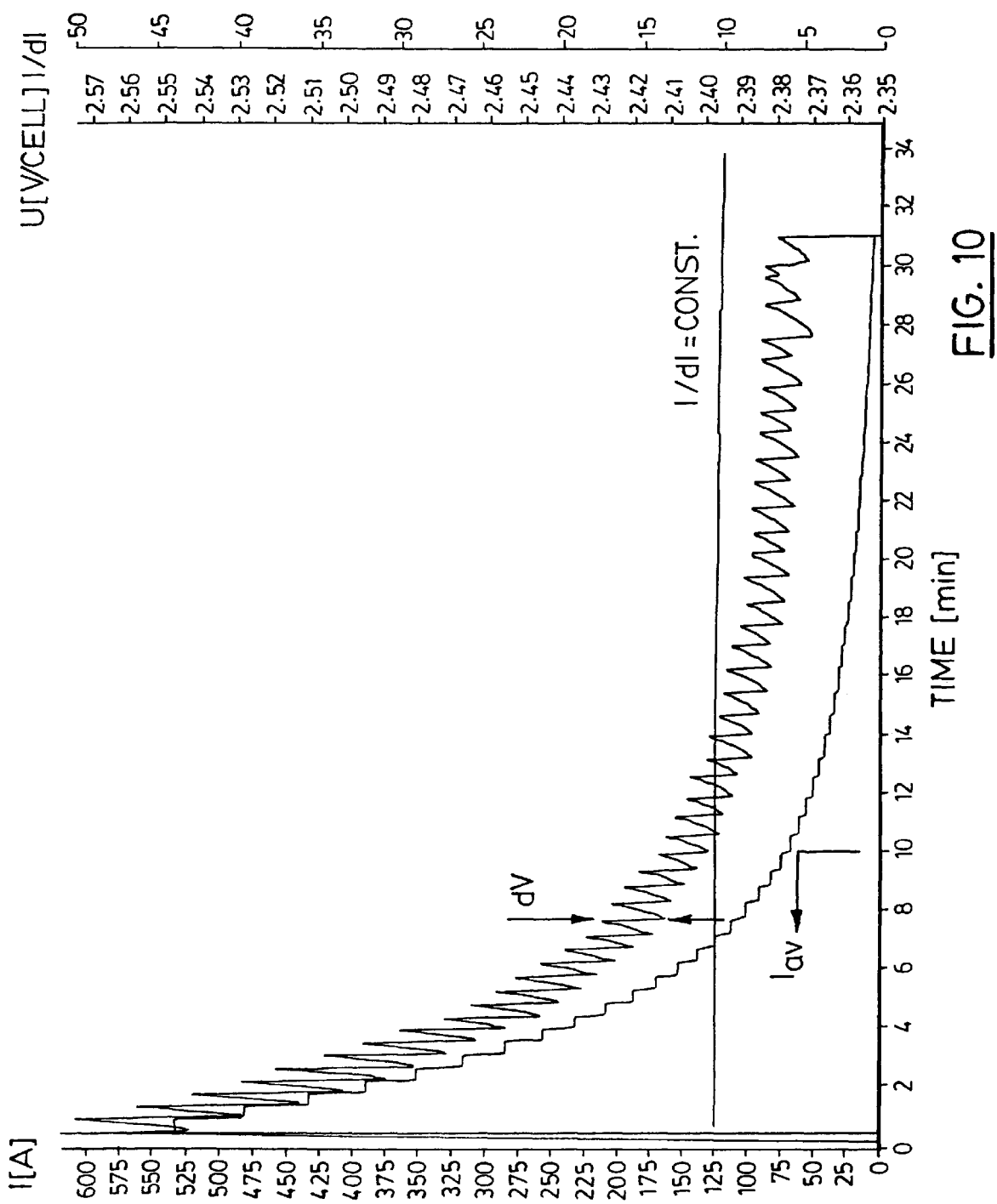
FIG. 10 is a graph showing control of the charging current based on the terminal voltage profile.

Referring to FIG. 6, if the charger is operating in LOW CURRENT MODE, i.e. STATUS=REGULATE is TRUE, then a counter flag "n" is checked in step 409. In REGULATE mode, the charge acceptance ability CAA is monitored in order to maintain the charging current I at an optimal level. (The counter flag n is set by the Regulate procedure as will be described below.) For the first pass after the REGULATE state has commenced the flag n will be one and the procedure 400 goes to step 415. In step 411, a parameter I·dV/dI is updated. The parameter I·dV/dI represents the step changes in the charging current I during the regulation phase and the resulting changes in the voltage dV. The relationship between the step decreases in the charging current I and the changes dV in the terminal voltage is shown in FIG. 10. In order to simplify the calculation, the step size for decreasing the charging current I is selected so that I/dI is a constant. Accordingly then in step 411, only the change in voltage dV needs to be measured. Next in step 413, the charge acceptance ability CAA is calculated as the difference between the first reading $(I·dV/dI)_1$ and the present reading $(I·dV/dI)_n$. The first reading $(I·dV/dI)_1$ corresponds to the state where CAA is zero, i.e. the battery charge acceptance ability had been reached. If the charge acceptance ability value calculated in step 413 is not zero, it means that the battery is not fully charged, and the setpoint can be increased. If the counter flag n is TRUE (i.e. n=1 in step 409), then the charge acceptance ability CAA is set to zero in step 415 to indicate that the battery is charged and the reading $(I·dV/dI)_1$ is updated in step 417. Control then returns to the calling procedure at step 419.

Referring back to FIG. 3 and the Ramp-Up procedure 300, at step 303 the procedure 300 checks if the charge acceptance ability CAA is greater than zero. If the CAA is greater than zero, then the battery is not fully charged and the charged current I can be increased or ramped-up further. In step 305, the charging current I is incrementally increased. In step 307, the setting for charging current I is compared to the maximum allowable current setting $I_{MAX}$ (stored in the Parameter table). If the maximum value for the charging current I is reached, then the status flag is set to HIGH in step 309 to indicate that the charger 10 is operating at high current, and therefore the ramp-up of the charging current I is complete. In step 311, the Ramp-Up procedure 300 returns to the charger control 100.

As shown in FIG. 3, if the charge acceptance ability CAA is not greater than zero, then the Ramp-Up procedure 300 checks if the charge acceptance ability CAA is equal to zero in step 313. If the charge acceptance ability CAA is not equal to zero, i.e. negative, then the charge acceptance ability for the battery has been exceeded and accordingly the charging current I is reduced in step 315. If the charge acceptance ability CAA is zero (or the maximum charging current has not been reached—step 307 described above), then the Ramp-Up function 300 compares the reading for terminal (e.g. resistance free) voltage $V_{rf}$ (i.e. taken during a variation in the charging current I) to the setpoint voltage $SV_{ref}$ in step 317. If the voltage reading $V_{rf}$ exceeds the setpoint voltage $SV_{ref}$, then the Ramp-Up operation should be terminated and the status flag is set to "Regulate" in step 319, and the counter flag "n" is set to zero in step 321 to indicate that the Regulate phase has been commenced. (The counter flag "n" is used by the charge acceptance procedure 400 as described above.) If the terminal voltage $V_{rf}$ is still less than the setpoint voltage $SV_{ref}$, then the Ramp-Up procedure 300 checks if the time for ramping-up the charging current I has expired in step 323. For example, if the ramp-up current is not reached within a predetermined time, then there could be a fault and such a condition should be flagged. The Ramp-Up procedure 300 then returns to the calling procedure in step 311.

Figure 4:
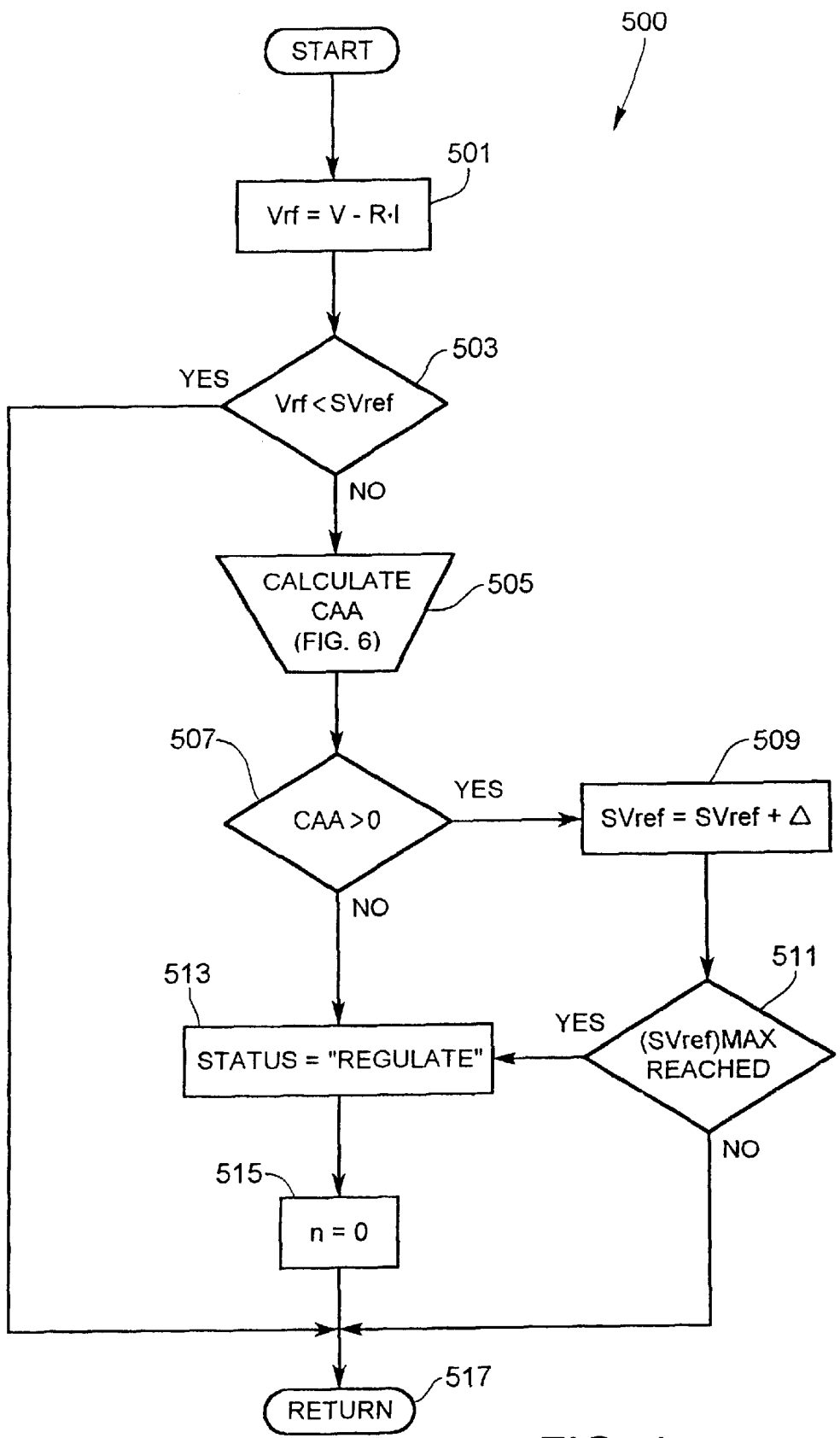
FIG. 4 is a flow chart of a high current control method for the charging method of FIG. 2.

Referring back to FIG. 2, the charging control program 100 checks if the status has been set to HIGH in step 113. The status is set to HIGH by the Ramp-Up procedure 300 when the maximum charging current $I_{MAX}$ is reached as described above. If status is HIGH, then the charging control program 100 calls a High Current Control procedure 500 in step 115. Referring to FIG. 4, the High Current Control procedure 500 controls the charging current I once it has been ramped-up to the maximum value $I_{MAX}$. As shown in FIG. 4, the first operation involves updating the value for the terminal voltage $V_{rf}$ in step 501. The terminal voltage $V_{rf}$ is updated in step 501 based on the current values obtained by the data acquisition module 201 for the voltage V, current I, and resistance R. The terminal or resistance free voltage is calculated according to the expression:

$$V_{RF} = V_{Hi} - \frac{I_{Hi}(V_{Hi} - V_{Low})}{(I_{Hi} - I_{Low})}$$

and the resistance R is calculated according to the expression:

$$R = (V_{Hi} - V_{Low})/(I_{Hi} - I_{Low})$$

The readings for voltage and current are taken when the charging current I is interrupted or varied. In the context of the present invention, the variation in the charging current I provides a window to measure the voltage and current parameters in order to calculate the terminal, i.e. resistance free, voltage $V_{rf}$ for the battery. The variations in the charging current I are regulated by the controller 12 and the programmable power supply 16 (FIG. 11). Suitable variations in the current I include a step change (e.g. the current is turned off, decreased to a non-zero value, or increased), a ramped change, a sinusoidal change, an exponential change, a logarithmic change.

Next in step 503, the High Current Control procedure 500 checks if the value for the terminal voltage $V_{rf}$ is less than the setpoint voltage $SV_{ref}$. If the voltage $V_{rf}$ is less than the setpoint voltage $SV_{ref}$, then the charge acceptance ability CAA of the battery is updated in step 505. The charge acceptance ability CAA for the battery is calculated as described above with reference to FIG. 6. If the charge acceptance voltage CAA is greater than zero (step 507), then the battery can take more charging current and accordingly the setpoint reference voltage $SV_{ref}$ is increased in step 509. According to this aspect of the invention, the setpoint voltage $SV_{ref}$ is optimally adjusted using the charge acceptance ability CAA of the battery.

As a safety check, the setpoint voltage $SV_{ref}$ adjusted in step 509 is compared to a maximum setpoint reference voltage $(SV_{ref})_{MAX}$ in step 511. If the maximum setpoint voltage $(SV_{ref})_{MAX}$ has been reached, then further charging could damage the battery so the charging status is set to REGULATE in step 513. Similarly, if the charge acceptance ability CAA is not greater than zero (step 507), then the charge status is set to REGULATE in step 513. Next in step 515, the counter flag "n" is reset to zero, and High current control procedure returns (step 517) to the charging control module 102.

Referring back to FIG. 2, the charging control program 102 next checks if the status is set for the REGULATE operation in step 117. (As described above, the High Current Control procedure 500 sets the status to REGULATE.) In step 119, a Charging Current Regulate procedure 600 is called by the charging control program 102. The function of the Charging Current Regulate procedure 600 is to regulate the charging current I in order to finish or complete the charging of the battery.

Figure 5:
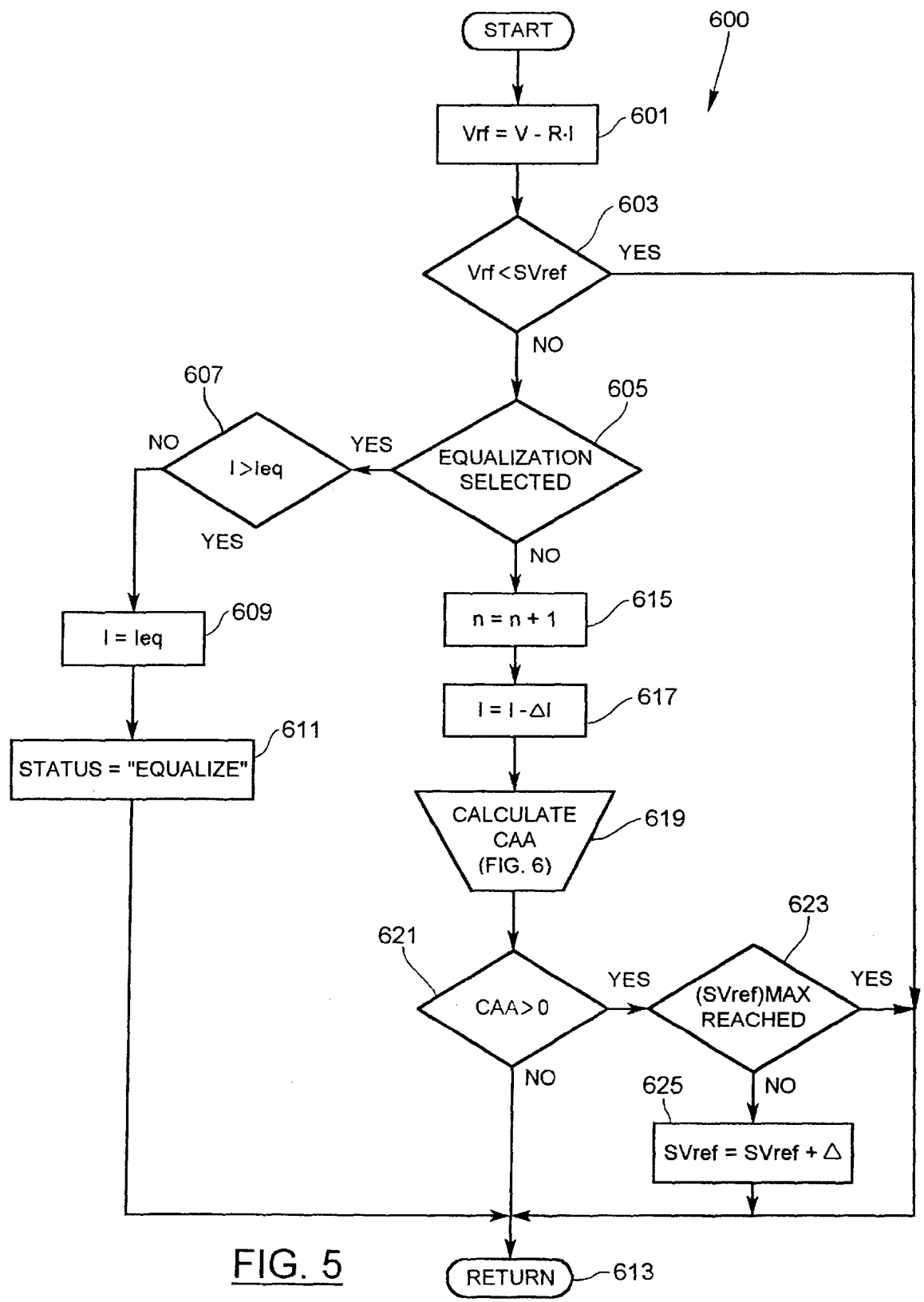
FIG. 5 is a flow chart of a current regulation method for the charging method of FIG. 2.

Reference is made to FIG. 5 which shows the Current Regulate procedure 600 in more detail. In step 601, the Regulate procedure 601 calculates the current value for the terminal, i.e. resistance free, voltage $V_{rf}$ using the voltage, current and resistance readings obtained by the data acquisition module 126 (FIG. 2). Next in step 603, the updated terminal voltage $V_{rf}$ is compared to the setpoint voltage $SV_{ref}$. If the voltage $V_{rf}$ is greater than the setpoint voltage $SV_{ref}$, then the Current Regulate procedure 600 ascertains if an equalization operation is to be performed in step 605. An equalization operation involves overcharging the battery at the end of a charge cycle with an elevated charging current I. The purpose of the elevated charging current is to bring all the cells in the battery pack to a full charge. The equalization operation is typically performed once every fifty charge cycles for a battery pack. If an equalization operation is being conducted, the charging current I is compared to the equalization current value $I_{eq}$ in step 607. If the charging current I is less than the predetermined equalization current $I_{eq}$, then the charging current I is set to the equalization value $I_{eq}$ in step 609 and the charge status is set to EQUALIZE in step 611. The Regulate procedure 600 then returns to the charging control program 102 in step 613.

Referring to FIG. 5, if equalization has not been selected (step 605) or the charging current I exceeds the equalization current (step 607), then the counter flag "n" is advanced in step 615. Next in step 617, the charging current I is incrementally decreased because the setpoint voltage has been reached. In step 619 the charge acceptance ability CAA is calculated by calling the charge acceptance procedure 400 (as described above with reference to FIG. 6). The step change in the charging current I in step 617 provides a convenient variation in the charging current I for determining the slope dV/dt. If the charge acceptance ability CAA as determined in step 619 is greater than zero (step 621), then the battery can take more charge and the setpoint voltage $SV_{ref}$ is checked in step 623. If the setpoint voltage $SV_{ref}$ is already at the maximum setpoint reference voltage $(SV_{ref})_{MAX}$, then the procedure 600 returns control to the charging control program 102 in step 613. On the other hand, if the maximum setpoint voltage $(SV_{ref})_{MAX}$ has not been reached, then the setpoint reference voltage $SV_{ref}$ is incrementally increased in step 625, and control is returned to the charging control program 102.

Referring back to FIG. 2, next in step 121, the end of the charging cycle is checked. The end of the charging cycle is determined by looking at one or more selected parameters. The parameters include the elapsed charge time, the value for the Coulombic charge Q, the value for charging current compared to the minimum charging current $I_{MIN}$, and the rate of change in the battery voltage $dV/d\tau$. For example, if the charging current being applied to the battery has tapered to the minimum value $I_{MIN}$, then it is assumed that the battery has been charged, i.e. it cannot accept further charge. Similarly, if the rate of change of battery voltage is essentially zero, then it is assumed that the battery is charged.

On the basis of an end of charge condition in step 121, a normal end of charge sequence is initiated in step 123. If a finishing or equalization charge (FIG. 5) is being applied, then the end of charge corresponds to the termination of the finishing charge sequence. The end of charge sequence (step 123) includes an orderly shutdown of the programmable power supply 16 (FIG. 11), i.e. the charging current I, and other hardware devices, followed by displaying a notification message on the panel 14.

If the end of the cycle has not been reached, the charging process continues and the safety limits are checked in step 125. The safety check in step 125 ensures that the charging cycle is still proceeding within the prescribed safety limits. The parameters checked in step 125 include the maximum allowable voltage $V_{MAX}$, the minimum voltage $V_{MIN}$, the maximum allowable battery temperature $T_{MAX}$, the maximum allowable Coulombic charge $Q_{MAX}$, the battery internal resistance R, and the battery pressure P. The maximum allowable values for these parameters depend on the electrochemical characteristics of the battery being charged, and may be conveniently stored in the Parameter table.

If one of the safety limits is exceeded in step 125, a fault condition is entered in step 127, and the charging cycle is terminated in step 129. The termination of the charging cycle is indicated on the display panel 14.

On the other hand, if the safety limits have not been exceeded, the charging cycle continues and the process control parameters and data are updated in step 131. The control parameters and data control the magnitude and application (i.e. variation) of the charging current being applied to the battery. The control parameters are then passed to the real time control module 202 in order to control the hardware devices, e.g. the programmable power supply 16.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of the fluency of the claims are therefore intended to be embraced therein.

What is claimed is:

1. An apparatus for rapidly charging a rechargeable battery, said apparatus comprising:
    generator means for generating a charging current having a variable level, and during a high charging period said charging current having a high level to rapidly charge the battery;
    controller means for controlling said generator means, said controller means including:
        (a) current control means for decreasing said charging current below said high level during said high charging period for a predetermined test interval; and
        (b) evaluation means for determining a charge acceptance ability of the battery during said test interval without exceeding said charge acceptance ability;
    wherein said evaluation means comprises means for measuring the slope of the battery voltage response to said decrease in said charging current, and wherein said current control means controls said charging current in response to said evaluation means.

2. The apparatus claimed in claim 1, wherein said evaluation means further comprises means for comparing said slope of the voltage response to a predetermined slope limit.

3. The apparatus claimed in claim 2, wherein said predetermined slope limit comprises the voltage response slope corresponding to said charge acceptance ability of the battery.

4. The apparatus claimed in claim 3, wherein said charge acceptance ability of the battery comprises a point at which continued charging at said high level would result in hydrolyzation within the battery.

5. The apparatus claimed in claim 2, wherein the battery comprises a first battery selected from a first group comprising lead-acid and nickel-cadmium batteries, and wherein said predetermined slope limit comprises a maximum slope that corresponds to said charge acceptance ability of said first battery.

6. The apparatus claimed in claim 2, wherein the battery comprises a second battery selected from a second group comprising nickel-metal hydride batteries, and wherein said predetermined slope limit comprises a minimum slope that corresponds to said charge acceptance ability of said second battery.

7. The apparatus claimed in claim 1, wherein said current control means controls said charging current in response to said evaluation means by ending said high charging period and initiating a regulated charging period when said evaluation means determines that said charge acceptance ability of the battery has been reached.

8. The apparatus claimed in claim 7, wherein said charge acceptance ability of the battery comprises a point at which continued charging at said high charging period charging current level would result in hydrolyzation within the battery.

9. The apparatus claimed in claim 7, further including means for decrementally lowering said charging current during said regulated charging period, said means for decrementally lowering being responsive to said evaluation means, such that said battery charge acceptance ability is not exceeded.

10. The apparatus claimed in claim 1, wherein said current control means comprises means for causing a step down in the magnitude of said charging current, and wherein said evaluation means comprises means for measuring the slope of the battery voltage response to said step down.

11. The apparatus claimed in claim 1, wherein said predetermined test interval is less than 1800 milliseconds.

12. A method of rapidly recharging a rechargeable battery, said method comprising the steps of:
    (a) supplying, during a high charging period, a charging current to the battery, said charging current having a variable level and having a level to rapidly charge the battery;
    (b) decreasing said charging current during said high charging period for a predetermined test interval;
    (c) determining a charge acceptance ability of the battery without exceeding said charge acceptance ability during said test interval; and
    (d) controlling said charging current in response to said measurement of the slope of the battery voltage response,
    wherein said step of determining comprises measuring the slope of the battery voltage response to said decrease in said charging current.

13. The method claimed in claim 12, wherein said step of determining further comprises comparing said slope of the battery voltage response to a predetermined slope limit.

14. The method claimed in claim 13, wherein said predetermined slope limit comprises the voltage response slope corresponding to said charge acceptance ability of the battery.

15. The method claimed in claim 14, wherein said charge acceptance ability of the battery comprises a point at which continued charging at said high charging period charging current level would result in hydrolyzation within the battery.

16. The method claimed in claim 13, wherein the battery comprises a first battery selected from a first group comprising lead-acid and nickel-cadmium batteries, and wherein said predetermined slope limit comprises a maximum slope that corresponds to said charge acceptance ability of said first battery.

17. The method claimed in claim 13, wherein the battery comprises a second battery selected from a second group comprising nickel-metal hydride batteries, and wherein said predetermined slope limit comprises a minimum slope that corresponds to said charge acceptance ability of said second battery.

18. The method claimed in claim 12, wherein said step of controlling said charging current comprises ending said high charging period and initiating a regulated charging period in response to said measurement of said slope when said slope indicates that said charge acceptance ability of the battery has been reached.

19. The method claimed in claim 18, wherein said charge acceptance ability of the battery comprises a point at which continued charging at said high charging period charging current level would result in hydrolyzation within the battery.

20. The method claimed in claim 18 further comprising the step of decrementally lowering said charging current during said regulated charging period, said step of decrementally lowering being responsive to step of determining, such that said battery charge acceptance ability is not exceeded.

21. The method claimed in claim 12, wherein said step of decreasing said charging current comprises causing a step down in the magnitude of said charging current, and wherein said step of determining comprises measuring the slope of the battery voltage response to said step down.

22. The method claimed in claim 12, wherein said predetermined test interval is less than 1800 milliseconds.

* * * * *